(12) United States Patent
Logachev (10) Patent No.: US 10,061,820 B2
(45) Date of Patent: Aug. 28, 2018

(54) GENERATING A USER-SPECIFIC RANKING MODEL ON A USER ELECTRONIC DEVICE

(71) Applicant: YANDEX EUROPE AG, Lucerne (CH)

(72) Inventor: Alexander Alexandrovich Logachev, Khimki (RU)

(73) Assignee: Yandex Europe AG, Lucerne (CH)

(*) Notice: Subject to any disclaimer, the term of this patent is extended or adjusted under 35 U.S.C. 154(b) by 157 days.

(21) Appl. No.: 15/100,337

(22) PCT Filed: Jan. 27, 2015

(86) PCT No.: PCT/IB2015/050625
§ 371 (c)(1),
(2) Date: May 30, 2016

(87) PCT Pub. No.: WO2016/027172
PCT Pub. Date: Feb. 25, 2016

(65) Prior Publication Data
US 2016/0299899 A1    Oct. 13, 2016

(30) Foreign Application Priority Data

Aug. 19, 2014 (RU) .............................. 2014133823

(51) Int. Cl.
*G06F 17/30* (2006.01)
*G06N 99/00* (2010.01)

(52) U.S. Cl.
CPC .... *G06F 17/3053* (2013.01); *G06F 17/30864* (2013.01); *G06F 17/30867* (2013.01); *G06N 99/005* (2013.01)

(58) Field of Classification Search
CPC ........... G06N 99/005; G06F 17/30867; G06F 17/3053; G06F 17/30864
See application file for complete search history.

(56) References Cited

U.S. PATENT DOCUMENTS 6,873,982 B1 *  3/2005  Bates ................ G06F 17/30648
                                                    707/737
7,409,422 B2    8/2008  Christian et al.
(Continued)

FOREIGN PATENT DOCUMENTS

CN    103092934 A    5/2013
CN    103853831 A    6/2014
(Continued)

OTHER PUBLICATIONS

International Search Report and Written Opinion from PCT/IB2015/050625, dated Jul. 20, 2015, Shane Thomas.
(Continued)

*Primary Examiner* — Robert Beausoliel, Jr.
*Assistant Examiner* — Susan F Rayyan
(74) *Attorney, Agent, or Firm* — BCF LLP (57) ABSTRACT

There is disclosed a method of generating a user-specific ranking model on an electronic device associated with a user. The method is executable on the electronic device. The method comprises: receiving, from a search engine server, via a communication network, an indication of a resource-specific feature; appreciating a user interaction with the web resource performed by the user using the electronic apparatus; based on the user interaction, determining a value parameter for the web resource; generating the user-specific ranking model on the basis of the value parameter and the resource-specific feature.

18 Claims, 4 Drawing Sheets

(56) References Cited

U.S. PATENT DOCUMENTS

| | | |
|---|---|---|
| 7,486,840 B2 | 2/2009 | Blais |
| 7,523,191 B1 | 4/2009 | Thomas et al. |
| 7,716,225 B1 | 5/2010 | Dean et al. |
| 7,747,611 B1 * | 6/2010 | Milic-Frayling ............ G06F 17/30867 707/722 |
| 7,769,740 B2 * | 8/2010 | Martinez ........... G06F 17/30864 707/706 |
| 7,827,170 B1 * | 11/2010 | Horling ............. G06F 17/30867 707/722 |
| 7,849,079 B2 * | 12/2010 | Chandrasekar ..... G06F 17/3087 707/723 |
| 7,941,525 B1 | 5/2011 | Yavilevich |
| 7,958,127 B2 * | 6/2011 | Edmonds ............... G06Q 30/02 707/748 |
| 8,117,197 B1 * | 2/2012 | Cramer ............. G06F 17/30702 706/12 |
| 8,140,566 B2 * | 3/2012 | Boerries ........... G06F 17/30867 707/732 |
| 8,166,026 B1 * | 4/2012 | Sadler ............... G06F 17/30867 707/722 |
| 8,234,275 B2 * | 7/2012 | Grant ................ G06F 17/30864 707/732 |
| 8,244,721 B2 * | 8/2012 | Morris .............. G06F 17/30967 707/723 |
| 8,250,054 B2 * | 8/2012 | Bennett ............. G06F 17/30525 707/706 |
| 8,312,009 B1 * | 11/2012 | Bostock ............ G06F 17/30696 707/723 |
| 8,359,319 B2 * | 1/2013 | Pendse ............. G06F 17/30867 707/748 |
| 8,429,536 B2 | 4/2013 | Callicrate et al. |
| 8,442,973 B2 * | 5/2013 | Cramer ............. G06F 17/30867 707/723 |
| 8,498,974 B1 * | 7/2013 | Kim .................. G06F 17/30424 707/706 |
| 8,543,668 B1 | 9/2013 | Long |
| 8,589,392 B2 * | 11/2013 | Topatan ............ G06F 17/30011 707/732 |
| 8,626,575 B1 | 1/2014 | Gong |
| 8,694,511 B1 * | 4/2014 | Corduneanu ..... G06F 17/30867 707/723 |
| 8,782,040 B2 * | 7/2014 | Guo ............................. 707/705 |
| 9,298,777 B2 * | 3/2016 | Lawrence ......... G06F 17/30867 |
| 9,529,915 B2 * | 12/2016 | Lymberopoulos ........................... G06F 17/30867 |
| 2005/0267854 A1 | 12/2005 | Blais |
| 2006/0074883 A1 | 4/2006 | Tevan et al. |
| 2007/0229538 A1 | 10/2007 | Klassen et al. |
| 2008/0250026 A1 | 10/2008 | Linden et al. |
| 2009/0089110 A1 * | 4/2009 | Lara .................. G06F 17/30867 705/7.32 |
| 2009/0119261 A1 * | 5/2009 | Ismalon ............. G06F 17/3064 |
| 2010/0153315 A1 * | 6/2010 | Gao .................... G06F 17/3053 706/12 |
| 2010/0228715 A1 * | 9/2010 | Lawrence .......... G06F 17/3053 707/706 |
| 2010/0325105 A1 * | 12/2010 | Guo .................. G06F 17/30899 707/723 |
| 2011/0145234 A1 | 6/2011 | Hu |
| 2011/0191310 A1 * | 8/2011 | Liao .................. G06F 17/30616 707/706 |
| 2011/0307411 A1 * | 12/2011 | Bolivar ............. G06Q 30/0282 705/347 |
| 2012/0209840 A1 * | 8/2012 | Gur .................. G06F 17/30389 707/733 |
| 2012/0310926 A1 | 12/2012 | Gannu et al. |
| 2012/0317109 A1 * | 12/2012 | Richter ............. G06F 17/30867 707/734 |
| 2012/0323828 A1 * | 12/2012 | Sontag ............. G06F 17/30011 706/12 |
| 2013/0110824 A1 | 5/2013 | Derose et al. |
| 2013/0130662 A1 * | 5/2013 | Schwartz ................ H04W 4/00 455/414.1 |
| 2013/0166544 A1 | 6/2013 | Guo et al. |
| 2013/0262455 A1 | 10/2013 | Cramer et al. |
| 2013/0282713 A1 | 10/2013 | Lawrence |
| 2013/0304906 A1 | 11/2013 | Yavilevich et al. |
| 2013/0339350 A1 | 12/2013 | Wei et al. |
| 2014/0025674 A1 * | 1/2014 | Kritt ................. G06F 17/30864 707/732 |
| 2014/0046922 A1 | 2/2014 | Crook et al. |

FOREIGN PATENT DOCUMENTS

| | | |
|---|---|---|
| EP | 1783631 A1 | 5/2007 |
| KR | 1020100058405 A | 6/2010 |
| KR | 1020100066651 A | 6/2010 |
| RU | 2419858 C2 | 5/2011 |
| RU | 2419860 C2 | 5/2011 |
| WO | 199913423 A1 | 3/1999 |
| WO | 2001045017 A1 | 6/2001 |
| WO | 2007079032 A2 | 7/2007 |
| WO | WO 2007079032 A2 * | 7/2007 ........ G06F 17/30867 |
| WO | 2010140160 A2 | 12/2010 |
| WO | 2011005948 A1 | 1/2011 |

OTHER PUBLICATIONS

International Preliminary Report on Patentability from PCT/IB2015/050625, dated Nov. 2, 2015, Shahid Alam.

Lu et al., Extending a Web Browser with Client-Side Mining, APWeb 2003, LNCS 2642, pp. 166-177, 2003.

Fredrikson et al., REPRIV: Re-Envisioning In-Browser Privacy, Microsoft Research Technical Report, Aug. 27, 2010, pp. 1-37.

English abstract of CN 103092934 retrieved from Espacenet on Nov. 17, 205.

English abstract of KR1020100058405 retrieved from Espacenet on Mar. 15, 2017.

English abstract of KR1020100066651 retrieved from Espacenet on Mar. 15, 2017.

English abstract of CN103853831 retrieved from Espacenet on Mar. 15, 2017.

English abstract of EP1783631 retrieved from Espacenet on Mar. 15, 2017.

* cited by examiner

GENERATING A USER-SPECIFIC RANKING MODEL ON A USER ELECTRONIC DEVICE

CROSS-REFERENCE

The present application claims priority to Russian Patent Application No. 2014133823, filed Aug. 19, 2014, entitled "A METHOD OF AND A SYSTEM FOR GENERATING A USER-SPECIFIC RANKING MODEL ON AN ELECTRONIC DEVICE ASSOCIATED WITH A USER" the entirety of which is incorporated herein.

FIELD OF THE TECHNOLOGY

The present technology relates to method of and system for a method for generating a user-specific ranking model on an electronic device associated with a user.

BACKGROUND

The Internet has grown to allow the user to access a plethora of information—from the latest news and watching movies on-line to checking a bank account balance through on-line banking, from ordering an airline ticket or a meal from a corner Chinese take-out place. In some situations, the user knows a particular web site that she is wishing to access. For example, when the user wishes to do her on-line banking with the Royal Bank of Canada, the user knows to access web site www.rbc.com.

In other circumstances, the user may not be aware of a particular web site that addresses his needs and he may need to perform what is known a web search using one of search engines, such as YANDEX, GOOGLE, YAHOO! or the like. As is known, the user enters a search query and the search engine provides a list of web resources that are responsive to the search query in what is known as a Search Engine Results Page or SERP, for short.

There are numerous search engines available to the user. Some of them are considered to be general purpose search engines (such as Yandex™, Google™, Yahoo™ and the like). Others are considered to be vertical search engines—i.e. search engines dedicated to a particular topic of search—such as Momondo™ search engine dedicated to searching flights.

Irrespective of which search engine is used, the search engine is generally configured to receive a search query from a user, to perform a search and to return a ranked search results page (SERP) to the user. Most search engines available today tend to sort the uncovered search engine results in the diminishing order of their relevancy to the search query—namely, the most relevant search engine is typically located at the top of the SERP, with the remainder of search results being listed in the order of diminishing relevancy. For example, for the search query "Madonna latest song" submitted to the GOOGLE™ search engine on Jul. 11, 2014 the most relevant search result is listed as "Give Me All Your Luvin' (Feat. MIA and Nicki Minaj)—YouTube" out of about 13,000,000 search results found. The general goal being to present the most relevant search result for the user as high on the SERP as possible and, preferably, within the first page of SERP so that the user does not have to browse the long list of search results, leave alone navigating the second, third, etc pages of the search results.

In order to rank search results, any given search engine uses ranking criteria to determine which result is more relevant than the other. Just as an example, some of the known techniques for ranking search results by relevancy to the user-submitted search query are based on some or all of: (i) how popular a given search query or a response thereto is in searches conducted by either the general web search or the vertical search; (ii) how many results have been returned by either the general web search or the vertical search; (iii) whether the search query contains any determinative terms (such as "images", "movies", "weather" or the like), (iv) how often a particular search query is typically used with determinative terms by other users; and (v) how often other users performing a similar search have selected a particular resource or a particular vertical search results when results were presented using the SERP.

The above search ranking criteria can be thought of as "generic search ranking criteria". It is generic in the sense that even through it takes into account what different users have selected as relevant search results, the search ranking criterion is not personalized to any specific users. However, when two different users run a particular search, they may be interested in very different things.

One will easily appreciate that millions and millions of users use the Internet every day and out of these millions and millions of users, the majority will use a commercially available search engine to discover the on-line content he or she is interested in. As one will further appreciate, even though two given users may be submitting the same query, they may have very different search intents and different search results will satisfy their respective search intent. In other words, if both of these given users submit the same search query (with a different search intent), yet are presented with the same SERP based on generic ranking criteria, one or both of the user may, in fact, not be satisfied with the presented SERP.

In the field of search engines and targeted online advertising, personalization of content presented to a user is one of the most important issues. Efforts have been made to determine the most relevant content for a given user, based on the given user's personal needs, interests and distinctive behavioral features. In order to achieve this, it has been known to collect and aggregate the given user's behavioral data on a search engine server or a targeted advertisement server. In other words, the search engine server or the targeted advertisement server would monitor a given user's interactions with various online entities and collect certain information about the given user's interactions.

Once collected, behavioral data is then analysed with use various statistical and machine learning methods and, as a result of this analysis, user personalized ranking model is created. User ranking model may be created with the use of so-called resource-specific features, which are specific parameters, calculated through analysis of user behavior for the given user.

Such features may represent a wide array of parameters, such as socio-demographical characteristics of users (such as but not limited to: age and sex, or interest affinities), specific user behavioral qualities (e.g. for example, the fact that the given user shops in online stores that have a physical location close to the given user's geo position, the fact that the user does or does not click on banner ads, etc).

The known approaches to personalization of search results rankers (whether the search results presented in response to the user's search query or when selecting a targeted message to be delivered to the given user) using a generic result ranking algorithm (i.e. the generic algorithm described above) and then re-ranks the so-generically-ranked results using resource-specific features.

Within some prior art approaches, the set of observed personalized parameters (not necessarily features themselves) can be assigned weights, by the server. The so-weighted personalized parameters are indicative to the search engine ranker or the targeted message ranker, which user qualities and interests are particularly strong for the given user and which are less important.

U.S. Pat. No. 8,442,973 granted to Cramer et al on May 14, 2013 discloses method and apparatus for utilizing user behavior to immediately modify sets of search results so that the most relevant documents are moved to the top. In one embodiment of the invention, behavior data, which can come from virtually any activity, is used to infer the user's intent. The updated inferred implicit user model is then exploited immediately by re-ranking the set of matched documents to best reflect the information need of the user. The system updates the user model and immediately re-ranks documents at every opportunity in order to constantly provide the most optimal results. In another embodiment, the system determines, based on the similarity of results sets, if the current query belongs in the same information session as one or more previous queries. If so, the current query is expanded with additional keywords in order to improve the targeting of the results.

SUMMARY

It is thus an object of the present technology to ameliorate at least some of the inconveniences present in the prior art.

According to a first broad aspect of the present technology, there is provided a method of generating a user-specific ranking model on an electronic device associated with a user. The method is executable on the electronic device. The method comprises: receiving, from a search engine server, via a communication network, an indication of a resource-specific feature; appreciating a user interaction with the web resource performed by the user using the electronic apparatus; based on the user interaction, determining a value parameter for the web resource; generating the user-specific ranking model on the basis of the value parameter and the resource-specific feature. Generally speaking, the resource-specific feature as a property or feature of the web resource that can be used for training a ranking algorithm.

In some implementations of the method, the method further comprises transmitting to the search engine server the user-specific ranking model, the user-specific ranking model to be combined with a generic ranking model available on the search engine server to create a combined ranking model, the combined ranking model for ranking search results generated on search queries originated from the user.

In some implementations of the method, the method further comprises transmitting to the search engine server the user-specific ranking model, the user-specific ranking model to be used with a generic ranking model available on the search engine to rank search results generated on search queries originated from the user.

In some implementations of the method, the user-specific ranking model and the generic ranking model are for ranking search results using the generic ranking model to generate a generically ranked search results list; and re-ranking generically ranked search results list using the user-specific ranking model to generate a user-centric ranked search results list.

In some implementations of the method, the resource-specific feature is the same resource-specific feature that is used by a generic ranking model used by the search engine server for ranking search results.

In some implementations of the method, the resource-specific feature comprises a plurality of resource-specific features each of the plurality of resource-specific features being the same resource-specific feature used in a generic ranking model used by the search engine server for ranking search results.

In some implementations of the method, the user interaction is indicative of a user preference associated with the web resource.

In some implementations of the method, the generating comprises applying a machine learning algorithm to create the user-specific ranking model using the resource-specific feature and the value parameter as a training set.

In some implementations of the method, the resource-specific feature is selected so that to optimize tracking of the user interaction on the electronic device.

In some implementations of the method, the method further comprises: transmitting to the search engine server the user-specific ranking model, receiving, from the user, a search request; sending the search request to the search engine server; receiving from the search engine a ranked search result list, the ranked search result list having been ranked by the search engine server by executing the steps of: ranking search results using the generic ranking model to generate a generically ranked search results list; and re-ranking generically ranked search results list using the user-specific ranking model to generate a user-centric ranked search results list.

In some implementations of the method, the method further comprises receiving, from the user, a search request; sending the search request to the search engine server; transmitting to the search engine server the user-specific ranking model, the user-specific ranking model to be combined with a generic ranking model available on the search engine server to create a combined ranking model; receiving from the search engine a ranked search result list, the ranked search result list having been ranked by the search engine server by applying the combined ranking model.

In some implementations of the method, the resource-specific feature is selected on the basis of a generic ranking model used by the search engine server to rank search results.

In some implementations of the method, the generic ranking model is in itself personalized based on a server-tracked user interaction associated with the resource-specific feature.

In some implementations of the method, the server-tracked user interaction associated with the resource-specific feature is of a different type than the resource-specific feature user interaction tracked by the electronic device.

According to another broad aspect of the present technology, there is provided a method of generating a user-centric ranking model. The method is executable at a search engine server, the search engine server being coupled to an electronic device via a communications network. The electronic device is associated with a user. The method comprises: transmitting to the electronic device, via the communication network, an indication of a resource-specific feature; receiving from the communication device, via the communication network, a resource-specific feature ranking model, the resource-specific feature ranking model having been generated by the electronic device by executing the steps of: appreciating a user interaction with the web resource performed by the user using the electronic apparatus; based on the user interaction, determining a value parameter for the web resource; generating the user-specific ranking model on the basis of the value parameter and the resource-specific feature.

In some implementations of the method, the method further comprises selecting the resource-specific feature for transmission to the electronic device.

In some implementations of the method, the resource-specific feature is the same resource-specific feature that is used in a generic ranking model used by the search engine server for ranking search results.

In some implementations of the method, the resource-specific feature comprises a plurality of resource-specific features each of the plurality of resource-specific features being the same resource-specific feature used in a generic ranking model used by the search engine server for ranking search results.

In some implementations of the method, the selecting comprises choosing the resource-specific feature so that to optimize tracking of the user interaction on the electronic device.

In some implementations of the method, the user interaction is indicative of a user preference associated with the web resource.

In some implementations of the method, the method further comprises receiving, from the electronic device, a search request; generating a set of search results responsive to the search query; ranking the set of search results using a generic ranking model to generate a generically ranked search results list; and re-ranking generically ranked search results list using the user-specific ranking model to generate a user-centric ranked search results list; sending the user-centric ranked search result list the electronic device.

In some implementations of the method, the method further comprises combining user-specific ranking model with a generic ranking model available on the search engine server to create a combined ranking model.

In some implementations of the method, the method further comprises receiving, from the electronic device, a search request; generating a set of search results responsive to the search query; using the combined ranking model, ranking the set of search results to generate a user-centric ranked search results list; sending the user-centric ranked search result list the electronic device.

In some implementations of the method, the combining comprises: adapting a value of the generic ranking model corresponding to the resource-specific feature to correspond to the one used in the user-specific ranking model.

According to another broad aspect of the present technology, there is provided an electronic device. The electronic device comprises: a user input interface for receiving user inputs; a user output interface for providing at least one of visual and audible outputs to the user; a network communication interface for two-way communication over a communications network; and a processor coupled to the user input interface, the user output interface an the network communication interface, the processor being configured to have access to computer readable commands which commands, when executed, cause the processor to execute: receive, from a search engine server, via the network communication interface, an indication of a resource-specific feature; appreciate a user interaction with the web resource performed by the user using the electronic apparatus; based on the user interaction, determine a value parameter for the web resource; generate the user-specific ranking model on the basis of the value parameter and the resource-specific feature.

In some implementations of the electronic device, the processor is further configured to: transmit to the search engine server, via the network communication interface, the user-specific ranking model, the user-specific ranking model to be combined with a generic ranking model available on the search engine server to create a combined ranking model, the combined ranking model for ranking search results generated on search queries originated from the user.

In some implementations of the electronic device, the processor is further configured to: transmit to the search engine server, via the network communication interface, the user-specific ranking model, the user-specific ranking model to be used with a generic ranking model available on the search engine to rank search results generated on search queries originated from the user.

In some implementations of the electronic device, the user-specific ranking model and the generic ranking model are for ranking search results using the generic ranking model to generate a generically ranked search results list; and re-ranking generically ranked search results list using the user-specific ranking model to generate a user-centric ranked search results list.

In some implementations of the electronic device, the resource-specific feature is the same resource-specific feature that is used by a generic ranking model used by the search engine server for ranking search results.

In some implementations of the electronic device, the resource-specific feature comprises a plurality of resource-specific features each of the plurality of resource-specific features being the same resource-specific feature used in a generic ranking model used by the search engine server for ranking search results.

In some implementations of the electronic device, the user interaction is indicative of a user preference associated with the web resource.

In some implementations of the electronic device, to generate, the processor is configured to apply a machine learning algorithm to create the user-specific ranking model using the resource-specific feature and the value parameter as a training set.

In some implementations of the electronic device, the resource-specific feature is selected so that to optimize tracking of the user interaction on the electronic device.

In some implementations of the electronic device, the processor being further configured to: receive from the user, via the user input interface, a search request; send, via the network communication interface, the search request to the search engine server; transmit to the search engine server, via the network communication interface, the user-specific ranking model; receive from the search engine, via the network communication interface, a ranked search result list, the ranked search result list having been ranked by the search engine server by executing the steps of: ranking search results using the generic ranking model to generate a generically ranked search results list; and re-ranking generically ranked search results list using the user-specific ranking model to generate a user-centric ranked search results list.

In some implementations of the electronic device, the processor being further configured to: receive from the user, via a user input interface, a search request; send, via the network communication interface, the search request to the search engine server; transmit to the search engine server, via the network communication interface, the user-specific ranking model, the user-specific ranking model to be combined with a generic ranking model available on the search engine server to create a combined ranking model; receive from the search engine, via the network communication interface, a ranked search result list, the ranked search result list having been ranked by the search engine server by applying the combined ranking model.

In some implementations of the electronic device, the resource-specific feature is selected on the basis of a generic ranking model used by the search engine server to rank search results.

In some implementations of the electronic device, the generic ranking model is in itself personalized based on a server-tracked user interaction associated with the resource-specific feature.

In some implementations of the electronic device, the server-tracked user interaction associated with the resource-specific feature is of a different type than the user interaction tracked by the electronic device.

According to another broad aspect of the present technology, there is provided a server coupled to a communication network. The server comprises: a communication interface for communication with an electronic device via the communication network, a processor operationally connected with the communication interface, the processor being configured to: transmit to the electronic device, via the communication interface, an indication of a resource-specific feature; receive from the communication device, via the communication interface, a resource-specific feature ranking model, the resource-specific feature ranking model having been generated by the electronic device by executing the steps of: appreciating a user interaction with the web resource performed by the user using the electronic apparatus; based on the user interaction, determining a value parameter for the web resource; generating the user-specific ranking model on the basis of the value parameter and the resource-specific feature.

In some implementations of the server, the processor is further configured to select the resource-specific feature for transmission to the electronic device.

In some implementations of the server, the resource-specific feature is the same resource-specific feature that is used in a generic ranking model used by the search engine server for ranking search results.

In some implementations of the server, the resource-specific feature comprises a plurality of resource-specific features each of the plurality of resource-specific features being the same resource-specific feature used in a generic ranking model used by the search engine server for ranking search results.

In some implementations of the server, to select, the processor is configured to choose the resource-specific feature so that to optimize tracking of the user interaction on the electronic device.

In some implementations of the server, the user interaction is indicative of a user preference associated with the web resource.

In some implementations of the server, the processor being further configured to: receive, via the network interface, from the electronic device, a search request; generate a set of search results responsive to the search query; rank the set of search results using a generic ranking model to generate a generically ranked search results list; and re-rank generically ranked search results list using the user-specific ranking model to generate a user-centric ranked search results list; send the user-centric ranked search result list the electronic device, via the network interface.

In some implementations of the server, the processor being further configured to: combine user-specific ranking model with a generic ranking model available on the search engine server to create a combined ranking model.

In some implementations of the server, the processor being further configured to: receive, via the network interface, from the electronic device, a search request; generate a set of search results responsive to the search query; using the combined ranking model, rank the set of search results to generate a user-centric ranked search results list; send the user-centric ranked search result list the electronic device, via the network interface.

In some implementations of the server, to combine, the processor is configured to: adapt a value of the generic ranking model corresponding to the resource-specific feature to correspond to the one used in the user-specific ranking model.

In the context of the present specification, unless specifically provided otherwise, a "server" is a computer program that is running on appropriate hardware and is capable of receiving requests (e.g. from client devices) over a network, and carrying out those requests, or causing those requests to be carried out. The hardware may be one physical computer or one physical computer system, but neither is required to be the case with respect to the present technology. In the present context, the use of the expression a "server" is not intended to mean that every task (e.g. received instructions or requests) or any particular task will have been received, carried out, or caused to be carried out, by the same server (i.e. the same software and/or hardware); it is intended to mean that any number of software elements or hardware devices may be involved in receiving/sending, carrying out or causing to be carried out any task or request, or the consequences of any task or request; and all of this software and hardware may be one server or multiple servers, both of which are included within the expression "at least one server".

In the context of the present specification, unless specifically provided otherwise, "client device" is any computer hardware that is capable of running software appropriate to the relevant task at hand. Thus, some (non-limiting) examples of client devices include personal computers (desktops, laptops, netbooks, etc.), smartphones, and tablets, as well as network equipment such as routers, switches, and gateways. It should be noted that a device acting as a client device in the present context is not precluded from acting as a server to other client devices. The use of the expression "a client device" does not preclude multiple client devices being used in receiving/sending, carrying out or causing to be carried out any task or request, or the consequences of any task or request, or steps of any method described herein.

In the context of the present specification, unless specifically provided otherwise, a "database" is any structured collection of data, irrespective of its particular structure, the database management software, or the computer hardware on which the data is stored, implemented or otherwise rendered available for use. A database may reside on the same hardware as the process that stores or makes use of the information stored in the database or it may reside on separate hardware, such as a dedicated server or plurality of servers.

In the context of the present specification, unless specifically provided otherwise, the expression "information" includes information of any nature or kind whatsoever capable of being stored in a database. Thus information includes, but is not limited to audiovisual works (images, movies, sound records, presentations etc.), data (location data, numerical data, etc.), text (opinions, comments, questions, messages, etc.), documents, spreadsheets, etc.

In the context of the present specification, unless specifically provided otherwise, the expression "component" is meant to include software (appropriate to a particular hardware context) that is both necessary and sufficient to achieve the specific function(s) being referenced.

In the context of the present specification, unless specifically provided otherwise, the expression "computer usable information storage medium" is intended to include media of any nature and kind whatsoever, including RAM, ROM, disks (CD-ROMs, DVDs, floppy disks, hard drivers, etc.), USB keys, solid state-drives, tape drives, etc.

In the context of the present specification, unless specifically provided otherwise, the words "first", "second", "third", etc. have been used as adjectives only for the purpose of allowing for distinction between the nouns that they modify from one another, and not for the purpose of describing any particular relationship between those nouns. Thus, for example, it should be understood that, the use of the terms "first server" and "third server" is not intended to imply any particular order, type, chronology, hierarchy or ranking (for example) of/between the server, nor is their use (by itself) intended imply that any "second server" must necessarily exist in any given situation. Further, as is discussed herein in other contexts, reference to a "first" element and a "second" element does not preclude the two elements from being the same actual real-world element. Thus, for example, in some instances, a "first" server and a "second" server may be the same software and/or hardware, in other cases they may be different software and/or hardware.

Implementations of the present technology each have at least one of the above-mentioned object and/or aspects, but do not necessarily have all of them. It should be understood that some aspects of the present technology that have resulted from attempting to attain the above-mentioned object may not satisfy this object and/or may satisfy other objects not specifically recited herein.

Additional and/or alternative features, aspects and advantages of implementations of the present technology will become apparent from the following description, the accompanying drawings and the appended claims.

BRIEF DESCRIPTION OF THE DRAWINGS

For a better understanding of the present technology, as well as other aspects and further features thereof, reference is made to the following description which is to be used in conjunction with the accompanying drawings, where.

DETAILED DESCRIPTION

Figure 1:
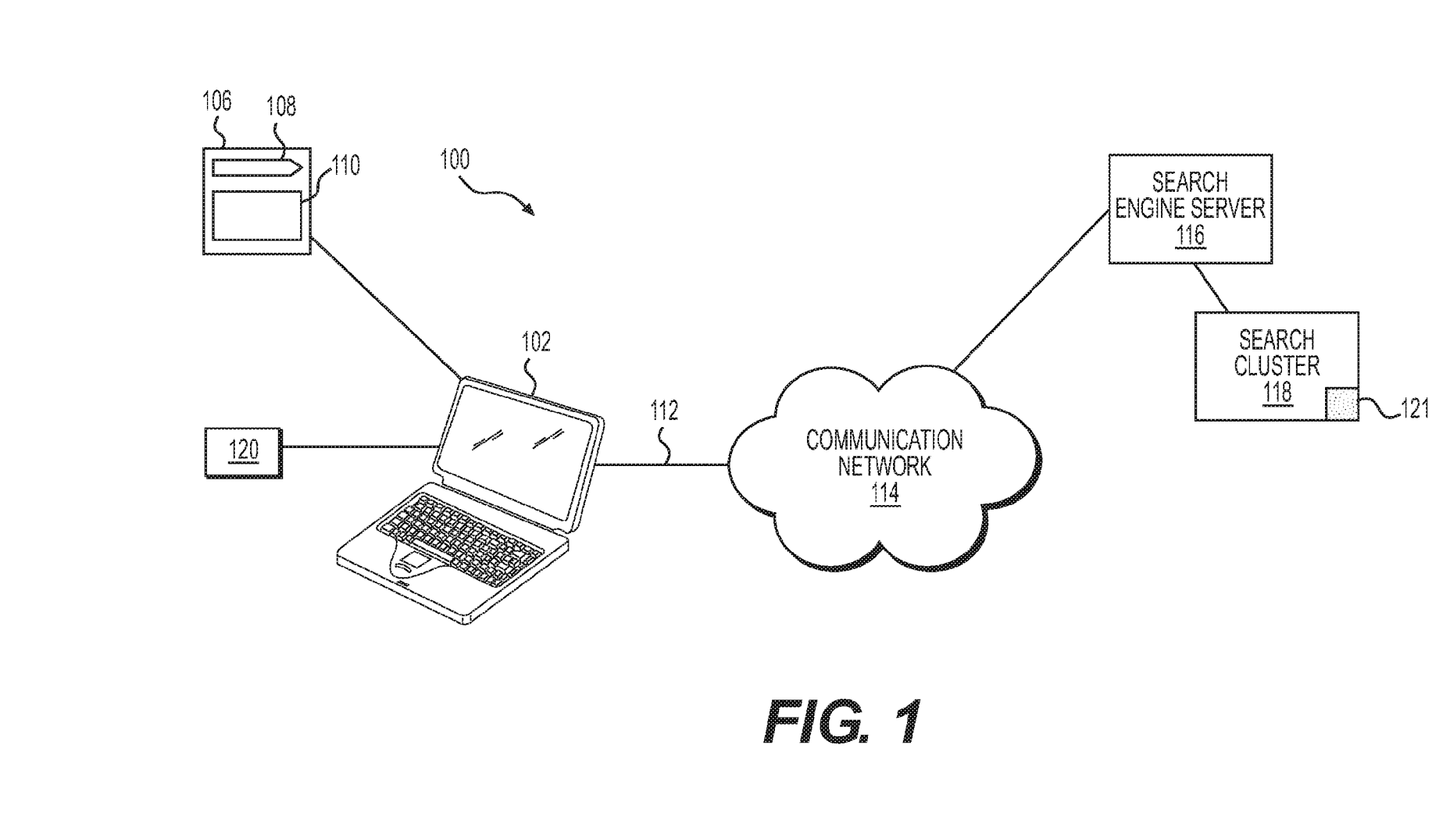
FIG. 1 is a schematic diagram of a system 100 implemented in accordance with an embodiment of the present technology.

Referring to FIG. 1, there is shown a diagram of a system 100, the system 100 being suitable for implementing non-limiting embodiments of the present technology. It is to be expressly understood that the system 100 is depicted as merely as an illustrative implementation of the present technology. Thus, the description thereof that follows is intended to be only a description of illustrative examples of the present technology. This description is not intended to define the scope or set forth the bounds of the present technology. In some cases, what are believed to be helpful examples of modifications to the system 100 may also be set forth below. This is done merely as an aid to understanding, and, again, not to define the scope or set forth the bounds of the present technology. These modifications are not an exhaustive list, and, as a person skilled in the art would understand, other modifications are likely possible. Further, where this has not been done (i.e. where no examples of modifications have been set forth), it should not be interpreted that no modifications are possible and/or that what is described is the sole manner of implementing that element of the present technology. As a person skilled in the art would understand, this is likely not the case. In addition it is to be understood that the system 100 may provide in certain instances simple implementations of the present technology, and that where such is the case they have been presented in this manner as an aid to understanding. As persons skilled in the art would understand, various implementations of the present technology may be of a greater complexity.

The system 100 comprises an electronic device 102. The electronic device 102 is typically associated with a user (not depicted) and, as such, can sometimes be referred to as a "client device". It should be noted that the fact that the electronic device 102 is associated with the user does not need to suggest or imply any mode of operation—such as a need to log in, a need to be registered or the like.

The implementation of the electronic device 102 is not particularly limited, but as an example, the electronic device 102 may be implemented as a personal computer (desktops, laptops, netbooks, etc.), a wireless electronic device (a cell phone, a smartphone, a tablet and the like), as well as network equipment (a router, a switch, or a gateway). Merely for the purposes of an illustration, it shall be assumed that the electronic device 102 is implemented as a laptop computer, such as LENOVO™ THINKPAD™ X220 lap top running a WINDOWS™ operating system.

The electronic device 102 comprises hardware and/or software and/or firmware (or a combination thereof) to execute a search application 106. Generally speaking, the purpose of the search application 106 is to enable the user (not depicted) to execute a web search using a search engine. How the search application 106 is implemented is not particularly limited. One example of the search application 106 may be embodied in a user accessing a web site associated with a search engine to access the search application 106.

For example, the search application 106 can be accessed by typing in an URL associated with Yandex search engine at www.yandex.ru. It should be expressly understood that the search application 106 can be accessed using any other commercially available or proprietary search engine. In alternative non-limiting embodiments of the present technology, the search application 106 may be implemented as a browser application on a portable device (such as a wireless electronic device). It should be expressly understood that any other commercially available or proprietary browser application can be used for implementing non-limiting embodiments of the present technology.

Generally, speaking, the search application 106 is configured to receive from the user (not depicted) a "search string" via a search bar 108 and to provide search results that are responsive to the user query via a search results interface 110. How the user query is processed and how the search results are presented is generally known in the art and, as such, will not be described here at much length.

According to embodiments of the present technology, the electronic device 102 comprises hardware and/or software and/or firmware (or a combination thereof) to execute a personalized ranking module 120. Functionality of the personalized ranking module 120 will be described in more detail herein below.

The electronic device 102 is coupled to a communication network 114 via a communication link 112. In some non-limiting embodiments of the present technology, the communication network 114 can be implemented as the Internet. In other embodiments of the present technology, the communication network 114 can be implemented differently, such as any wide-area communication network, local-area communication network, a private communication network and the like.

How the communication link 112 is implemented is not particularly limited and will depend on how the electronic device 102 is implemented. Recalling that the electronic device 102 can be implemented, in this example, as a smartphone, the communication link 112 can be wireless (such as the Wireless Fidelity, or WiFi® for short, Bluetooth® or the like).

It should be expressly understood that implementations for the electronic device 102, the communication link 112 and the communication network 114 are provided for illustration purposes only. As such, those skilled in the art will easily appreciate other specific implementational details for the electronic device 102, the communication link 112 and the communication network 114. As such, by no means, examples provided herein above are meant to limit the scope of the present technology.

To enable the user of the electronic device 102 to execute a search using the search application 106, coupled to the communication network 114 is a search engine server 116. The search engine server 116 can be implemented as a conventional computer server. In an example of an embodiment of the present technology, the search engine server 116 can be implemented as a Dell™ PowerEdge™ Server running the Microsoft™ Windows Server™ operating system. Needless to say, the search engine server 116 can be implemented in any other suitable hardware and/or software and/or firmware or a combination thereof. In the depicted non-limiting embodiment of present technology, the search engine server 116 is a single server. In alternative non-limiting embodiments of the present technology, the functionality of the search engine server 116 may be distributed and may be implemented via multiple servers.

The search engine server 116 is configured to access a search cluster 118. In the depicted embodiment, the search engine server 116 is coupled to the search cluster 118 via a dedicated link (not numbered). Alternatively, the search engine server 116 can access the search cluster 118 via the communication network 114. Yet in other embodiments, the search cluster 118 can be implemented as part of the search engine server 116.

The search engine server 116 can be configured to execute web searches via the search cluster 118. Functionality of the search engine server 116 is generally known, but briefly speaking, the search engine 115 is configured to: (i) receive a search query from the electronic device 102, the search query having been entered by the user via the search bar 108; (ii) to process the search query (normalize the search query, extract key words, etc); (iii) to execute a search for web resources that are responsive to the search query by accessing an internal index (not depicted), the internal index containing an index of crawled web resources; (iv) execute one or more relevant vertical searches, such as an image search, a video search, a maps search and the like; and (v) to return a ranked list of search results to the electronic device 102 for the search application 106 to output to the user the SERP containing links to web resources that are responsive to the search query within the search results interface 110.

In order to return the ranked list of search results, the search cluster is configured to execute a ranking routine 121. Generally speaking, the rankling routine 121 is configured to rank the search results in accordance to a ranking algorithm.

According to embodiments of the present technology, the ranking algorithm utilized by the ranking routine 121 is based on two models: (i) generic ranking model and (ii) user-specific ranking model, the user-specific ranking model based on the resource-specific feature. Within embodiments of the present technology, the resource-specific feature is determined by the electronic device 102 (and, more specifically by the personalized ranking module 120). In some embodiments of the present technology, the user-specific ranking model is built, based on the resource-specific feature, by the electronic device 102 (and, more specifically by the personalized ranking module 120).

In some embodiments of the present technology, the resource-specific features are defined by the search engine server 116. In alternative embodiments, while some of the resource-specific features are defined by the search engine server 116, others of the resource-specific features can be defined by the electronic device 102.

Generally speaking, the personalized ranking module 120 generates the user-specific ranking model based on (i) an indication of a resource-specific feature to be tracked received from the search engine server 116 and (ii) appreciation of a user interaction performed by the user using the electronic device 102 and based on the user interaction, determining a value parameter for the resource-specific feature, which value parameter is used to generate the user-specific ranking model. More specifically, the value parameter can be used as a value label for training the user-specific ranking model using the resource-specific features.

Figure 2:
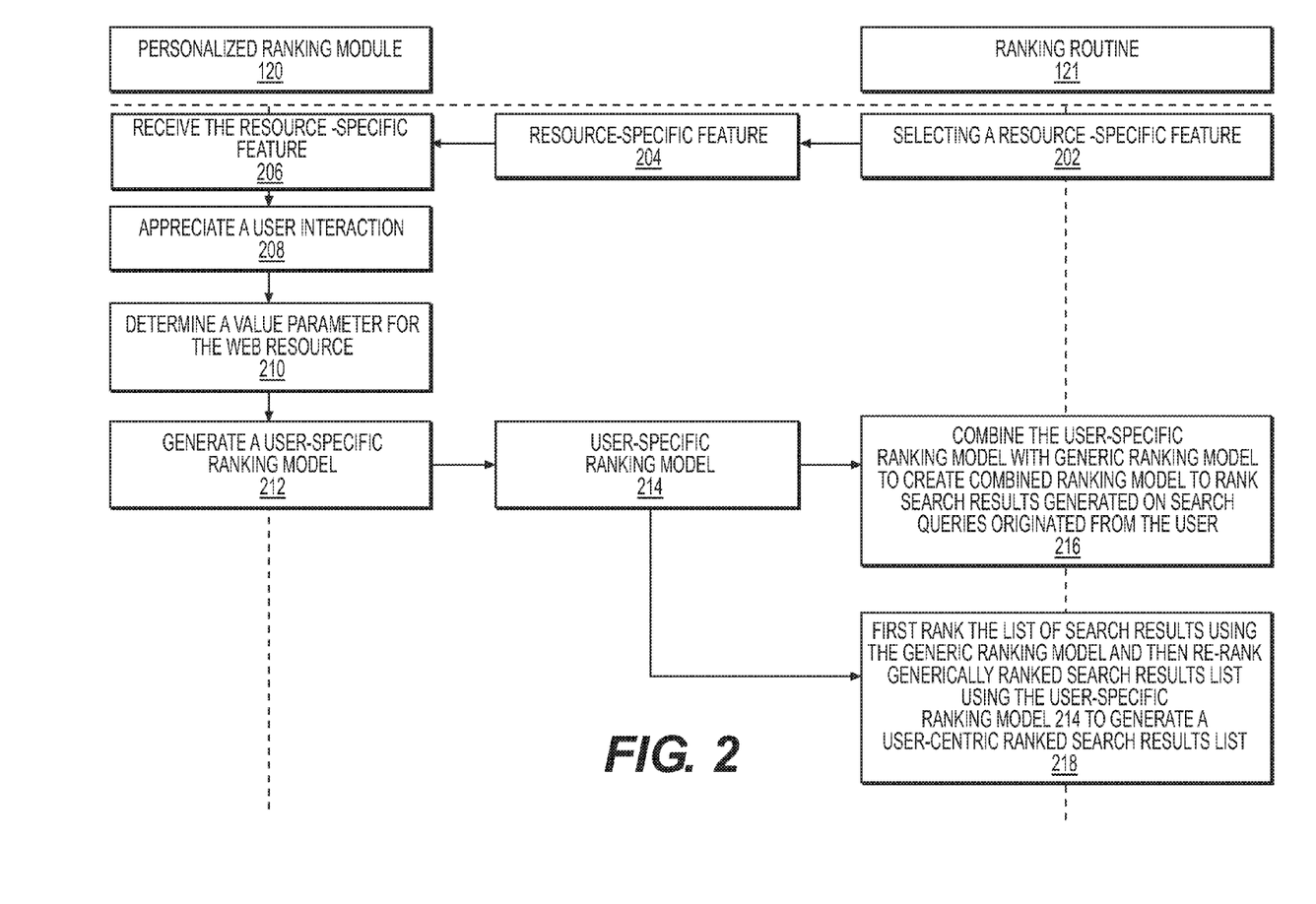
FIG. 2 depicts a flow chart of a method 200, the method being executed within the system 100 and being executed in accordance with non-limiting embodiments of the present technology.

Now, we will describe the operation of the personalized ranking module 120 is greater detail. With reference to FIG. 2, there is depicted a signal flow and processing chart between the personalized ranking module 120 and the ranking routine 121 via the communication network 114.

At a process 202, the ranking routine 121 selects a resource-specific feature 204 associated with a web resource. How the web resource is selected is not particularly limited—for example, the web resource can be one of multiple web resources that came up in a search as part of the Search Engine Results Page (SERP). As another example, the web resource can be a top result of multiple web resources that came up in a search as part of the Search Engine Results Page (SERP) that is presented to the user. As will become evident below, the web resource is used as a representative selection for training a ranking algorithm (i.e. a user-specific ranking model).

In some embodiments of the present technology, the ranking routine 121 can select the resource-specific feature from a plurality of resource-specific features used in the generic ranking algorithm used by the ranking routine 121. In some embodiments, the resource-specific feature 204 can comprise a subset of a plurality of resource-specific features used in the generic ranking algorithm used by the ranking routine 121.

In some embodiments, the ranking routine 121 can select the resource-specific feature 204 such that to optimize tracking of the user's response to the resource-specific feature 204. In other words, the ranking routine 121 can select those ones of the resource-specific features used in the generic ranking algorithm used by the ranking routine 121 that are better and/or more effectively and/or more securely tracked at the electronic device 102 rather than on the search engine server 116.

In yet other embodiments, the ranking routine 121 can select those ones of the resource-specific features used in the generic ranking algorithm used by the ranking routine 121 that can only be tracked at the electronic device 102 and not on the search engine server 116. For example, if a specific resource-specific feature requires observing how the user moves the mouse (not depicted) of or coupled to the electronic device 102 over a given web page, this can only be tracked locally at the electronic device 102.

Examples of the resource-specific feature 204 that can be selected by the ranking routine 121 include but are not limited to:

(i) complexity of the text presented on a web page;
(ii) presence of images and/or video;
(iii) how well the search result matches the search query;
(iv) readability of the text on a web page;
(v) recency of content of a web page;
(vi) how often a given advertised resource is visited;
(vii) color scheme of the web resource or an ad;
(viii) nature of the merchant associated with a web commerce web resource;
(ix) delivery time associated with the merchant associated with the web commerce web resource.

In some embodiments, the indication of the resource-specific feature can contain the actual resource-specific feature. In other embodiments, the indication of the resource-specific feature can contain a value associated with the resource-specific feature, the value having been determined by the ranking routine 121. Within these embodiments, the value assigned to the resource-specific feature by the ranking routine 121 can be thought of as a "generic" or "non-user specific" value.

Naturally, the above list is not meant to be exhaustive and several alternative examples of the resource-specific feature 204 can be used. Also, as has been alluded to above some of these resource-specific features 204 can be defined (and their base value predicted) by the search engine server 116, while others of these resource-specific features 204 can be defined by the electronic device 102.

Next, the ranking routine 121 transmits to the electronic device 102, via the communications network 114, the resource-specific feature 204. Accordingly, at process 206, the personalized ranking module 120 of the electronic device 102, receives the resource-specific feature 204.

At process 208, the personalized ranking module 120 appreciates a user interaction associated with the electronic device 102. In some embodiments, the personalized ranking module 120 is monitoring for a specific user interaction that is indicative of a user preference associated with the web resource—for example, whether the web resource is responsive to the user search intent. In more details, the user interaction can be indicative of the user preference as follows:

The personalized ranking module 120 can track the amount of time the user spends browsing the web resource—as an example, the longer the time the more indicative it is of the higher relevancy of the web resource.

The personalized ranking module 120 can track the scrolling speed along the content of the web resource—as an example, the slower the speed the more indicative it is of the higher relevancy of the web resource.

The personalized ranking module 120 can track how deep the user clicks through hyperlinks of the web resource—as an example, the deeper the user browses through the hyper links the more indicative it is of the higher relevancy of the web resource.

The personalized ranking module 120 can track user's interaction with media content elements within the web resource—as an example, the more the user has clicked on video content elements within the web resource the more indicative it is of the higher relevancy of the web resource.

The personalized ranking module 120 can track the patterns of the mouse (or any other auxiliary input device) movement—as an example, the longer the user has hovered the mouse over a text (meaning the user was reading the text)—the more indicative it is of the higher relevancy of the web resource.

The personalized ranking module 120 can track if the user has copied any portions of the web resource into clipboard of the electronic device 102—as an example, the fact of copying may be indicative it is of the higher relevancy of the web resource.

The personalized ranking module 120 can track if the user has downloaded the web resource—as an example, the fact of downloading may be indicative it is of the higher relevancy of the web resource.

The personalized ranking module 120 can track user interaction with a specific element of the web resource—such as clicking on an e-mail address or the like—as an example, the fact of interaction with the specific element may be indicative it is of the higher relevancy of the web resource. Alternatively, the specific element of the web site can be forms to be filled or other fields to be filled.

Naturally, rather than looking at a single parameter, the personalized ranking module 120 may look at a combination of parameters, assigning a respective value (or a weighted) value to each of the parameters and then generating the composite parameter.

At process 210, the personalized ranking module 120 generates a value parameter for the web resource, based on the user interaction observed at the process 208. In some embodiments of the present technology, the value parameter for the web resource can be a single parameter indicative of a single user interaction. In other embodiments of the present technology, the value parameter can be a composite value parameter indicative of several user interactions observed over a predetermined period of time.

In some embodiments of the present technology, the personalized ranking module 120 can store an indication of the value parameter (or an indication of a plurality of value parameters) in a local memory (not depicted) of the electronic device 102.

Effectively, the value parameter associated with the web resource can be treated as a "label" indicative of whether the user has found the web resource useful or not. As such, the value parameter can be binary (good-bad, 1-0, low-high, etc), scale-based (0-10, good-better-best, 0%-100% and the like) or of any other type.

The processes 202-210 can be repeated until a sufficient number of web resources and the associated value parameters are compiled to present a training set to train the user-specific ranking model.

Then at process 212, the personalized ranking module 120 generates a user-specific ranking model. In some embodiments of the present technology, the personalized ranking module 120 employs a machine learning algorithm to create the user-specific ranking model using the resource-specific feature and the value parameter as a training set. In some embodiments of the present technology, the machine learning algorithm used by the personalized ranking model 120 is the same machine learning algorithm used by the ranking routine 121 for creating and maintaining the generic ranking model used by the ranking routine 121.

In some embodiments of the present technology, the machine learning algorithm used by the personalized ranking model 120 is trained using the resource-specific feature (i.e. on the same features used for training the machine learning algorithm used by the ranking routine 121 for creating and maintaining the generic ranking model used by the ranking routine 121) and the value parameter (i.e. the label assigned based on tracking executed by the electronic device 102).

In some embodiments of the present technology, the machine learning algorithm is programmed into the personalized ranking module 120. In other embodiments, the machine learning algorithm is downloaded to the personalized ranking module 120 from the search engine server 116.

In some embodiments of the present technology, the personalized ranking module 120 can store an indication of the user-specific ranking model in a local memory. Within these embodiments, the personalized ranking module can transmit the user-specific ranking model 214 to the ranking routine 121 only when the user performs a search and when there is a need for the ranking routine 121 to use the user-specific ranking model 214 to rank the search results (as will be described herein below). Within these embodiments of the present technology, a particular technical effect can be associated with local storage of the user-specific ranking model 214—namely, improved privacy of user information.

Alternatively, the personalized ranking module 120 can transmit the user-specific ranking model 214 to the ranking routine 121. In some embodiments of the present technology, the user-specific ranking model 214 contains an indication of the user with whom the user-specific ranking model 214 is associated with.

In some implementations, the indication of the user includes an IP address of the electronic device 102. In other implementations, the indication of the user includes another identifier of the electronic device 102, such as a MAC address and the like. In yet further implementations, the indication of the user includes a user log in associated with the user, the user log in for authenticating the user in one or more services, such as a mail service, a chat service, a social media service and the like. Generally speaking and irrespective of the specific implementation of the indication of the user, the purpose for the indication of the user is to identify the user, with whom the user-specific ranking model 214 is associated with.

Next, the ranking routine 121 receives the user-specific ranking model 214 (via the communication network 114). In some embodiments of the present technology, the electronic device 102 transmits the user-specific ranking model 214 or an updated version of the user-specific ranking model 214 when the user has submitted a search request using the electronic device 102.

Alternatively, the ranking routine 121 receive the user-specific ranking model 214 (or an updated version thereof) at pre-determined intervals of time (such as every hour, every day, every week, every time the user logs on a new electronic device 102 and the like). In other embodiments, the search engine server 116 may request the electronic device 102 to transmit the user-specific ranking model 214. This request can be sent on a periodic basis, for example. The periodic basis can include every hour, every day, every week, every time the search engine server 116 has a scheduled rankling routine 121 re-training and the like).

Next, we will explain how the ranking routine 121 deals with the user-specific ranking model 214.

Combination of the Generic Ranking Model and the User-Specific Ranking Model 216

In some embodiments, as part of a process 212, the ranking routine 121 can combine the user-specific ranking model 214 and the generic ranking model to create a combined ranking model to rank search results generated on search queries originates from the user associated with the electronic device 102.

Recalling that at process 202, the ranking routine 121 has defined at least some of the resource-specific feature 204 for tracking at the electronic device 102, the ranking model 121 effectively knows the basis upon which the user-specific ranking model 214 was built on.

Hence, in some embodiments of the present technology, the ranking routine 121 can combine the user-specific ranking model 214 and the generic ranking model by substituting the generic value used for a specific resource-specific feature with the generic ranking model (i.e. the one that was trained based on generic value parameters associated with other users) with the specific resource-specific feature associated with the user of the electronic device 102. In some embodiments, the step of combining can be implemented as retraining the generic ranking model using the user-specific ranking model.

In a sense, this combining personalizes the generic ranking model to be user-centric. The ranking routine 121 can further associated such user-centric combined ranking model with the indication of the user, which indication of the user may have been received as part of the user-specific ranking model 214.

Naturally, depending of which algorithm is employed by the ranking routine 121 to create the generic ranking model, other approaches to the combination of the user-specific ranking model 214 and the generic ranking model can be used.

Sequential Use of the Generic Ranking Model and the User-Specific Ranking Model 214

In other embodiments of the present technology, the ranking routine 121 may not combine the user-specific ranking model 214 and the generic ranking model per se. Instead, as part of a process 218, when the ranking routine 121 receives a set of search results to be ranked, the set of search results having been generated in response to a search query received from the user of the electronic device 102, the ranking routine 121 first ranks the list of search results using the generic ranking model and then re-ranks generically ranked search results list using the user-specific ranking model 214 to generate a user-centric ranked search results list.

Irrespective whether the ranking rating 121 uses the user-specific ranking model 214 to generate the combined ranking model or to execute the two step ranking process, the outcome of the embodiments of the present technology results in the search results list that is user-centric or, in other words, is ranked on the basis of user-centric specific preferences.

What is even more important, the user-centric specific preferences have been determined on the client side (i.e. by the electronic device 102) and, therefore, embodiments of the present technology involve comparatively less of private user information being tracked on the server side (i.e. by the search engine server 116). More specifically, rather than tracking user interactions and user preferences at the search engine server 116, the tracking of user interactions and user preferences is done at the electronic device 102. What is transmitted between the electronic device 102 and the search engine server 116 is the user-specific ranking model 214, which is in a sense an anonymized representation of the user preferences.

Therefore embodiments of the present technology can be said more secure from the user privacy perspective.

Some other embodiments of the present technology have another technical effect. The choice of resource-specific feature 204 to be tracked on the electronic device 102 may provide further insights into specific user preference, which insights may not be available at (or not attainable by) the search engine server side 116.

For example, the personalized ranking module 120, located on the electronic device 102, may be able to track user interactions that are simply not "visible" to the search engine server 116. For example, the personalized ranking module 120 may appreciate how fast the given user scrolls up or down the given web resource. As another example, the personalized ranking module 120 may appreciate how the given user moves the cursor on the screen and what specific items on the screen the given user hovers the cursor over. These insights into user interactions (which insights may not be readily available for tracking at the search engine server 116) may provide important insights into user preferences and help to generate a more effective user-centric ranking model.

It should be understood that even though the description above has consistently used search result ranking as the application field for the user-specific ranking model 214 of the present technology, it should be expressly understood that teachings of the present technology are not so limited. As such, the user-specific ranking model 214 implemented in accordance with various embodiments can be used for ranking search results, selection and/or ranking of targeted messages (such as text ads, banner ads and the like), and the like.

Figure 3:
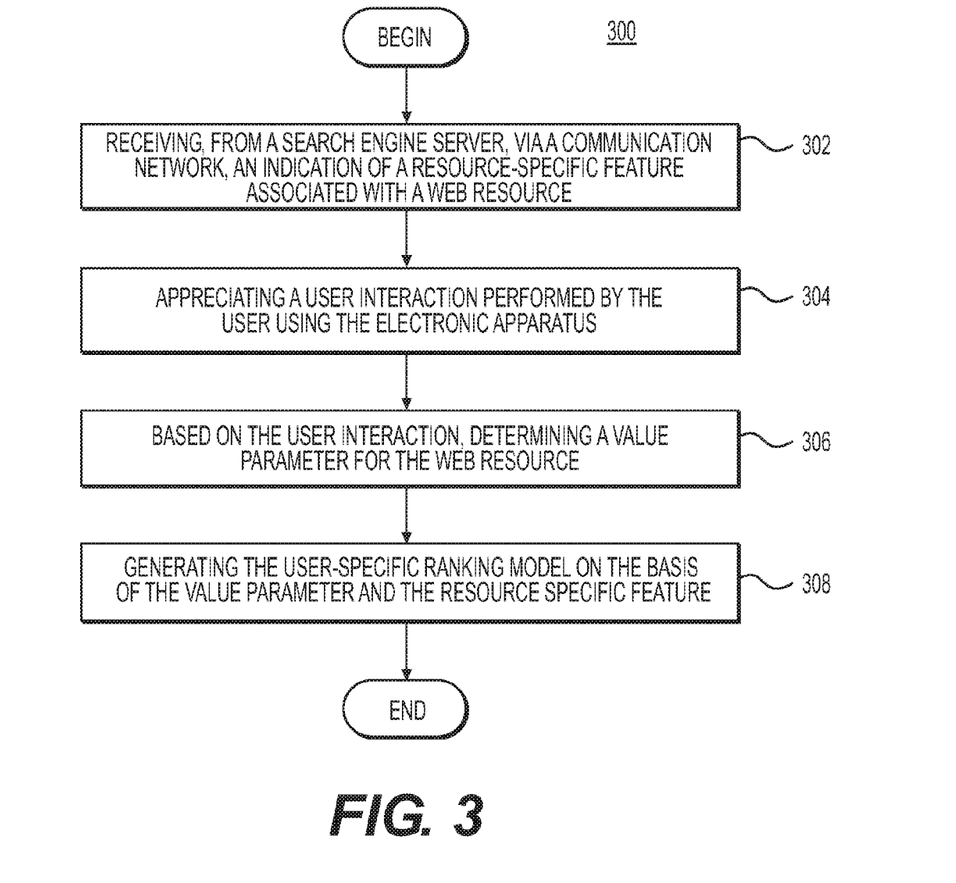
FIG. 3 is a flow chart of a method 300, the method 300 being executed in accordance with non-limiting embodiments of the present technology.

Given the architecture of the system 100 of FIG. 1, given the processes described with reference to FIG. 2, it is possible to implement a method of generating a user-specific ranking model. With reference to FIG. 3, there is depicted a flow chart of a method 300, the method 300 being executed in accordance with non-limiting embodiments of the present technology. The method 300 can be executed on the electronic device 102, the electronic device 102 being associated with a user. The method 300 can be executed by the personalized ranking module 120 executed on the electronic device 102.

Step 302—Receiving, from a Search Engine Server, Via a Communication Network, an Indication of a Resource-Specific Feature Associated with a Web Resource The method 300 begins at step 302, where the electronic device 102 receives, from the search engine server 116, via the communication network 114, an indication of a resource-specific feature associated with a web resource.

As has been described above, the resource-specific feature can be the same resource-specific feature that is used by a generic ranking model used by the search engine server 116 for ranking search results or for training the machine learning algorithm used by the search engine server 116. In alternative embodiments, the resource-specific feature can be implemented as a plurality of resource-specific features, each of the plurality of resource-specific features can be the same resource-specific feature used in a generic ranking model used by the search engine server 116 for ranking search results.

In some embodiments of the present technology, the resource-specific feature is selected so that to optimize tracking of the user interaction on the electronic device 102. For example, the resource-specific feature can be selected such that the tracking of user interaction in respect to the resource-specific feature is better tracked locally on the electronic device 102, compared to the search engine server 116. As another example, the resource-specific feature can be selected such that the tracking of user interaction in respect to the resource-specific feature is only possible locally on the electronic device 102, and is not possible to be tracked at the search engine server 116.

The method 300 then proceeds to step 304.

Step 304—Appreciating a User Interaction Performed by the User Using the Electronic Apparatus Next, at step 304, the electronic device 102 appreciates a user interaction performed by the user using the electronic apparatus 102. Within some embodiments of the present technology, the user interaction is indicative of a user preference associated with the web resource.

The method 300 then proceeds to step 306.

Step 306—Based on the User Interaction, Determining a Value Parameter for the Web Resource Next, at step 306, the electronic device 102, based on the user interaction, determines a value parameter for the web resource.

Within some embodiments of the present technology, the value parameter is representative of the user preference for the web resource.

Some examples of heuristics that the electronic device 102 can user to determine the value parameter are listed below.

The personalized ranking module 120 can track the amount of time the user spends browsing the web resource—as an example, the longer the time the more indicative it is of the higher relevancy of the web resource.

The personalized ranking module 120 can track the scrolling speed along the content of the web resource—as an example, the slower the speed the more indicative it is of the higher relevancy of the web resource.

The personalized ranking module 120 can track how deep the user clicks through hyperlinks of the web resource—as an example, the deeper the user browses through the hyper links the more indicative it is of the higher relevancy of the web resource.

The personalized ranking module 120 can track user's interaction with media content elements within the web resource—as an example, the more the user has clicked on video content elements within the web resource the more indicative it is of the higher relevancy of the web resource.

The personalized ranking module 120 can track the patterns of the mouse (or any other auxiliary input device) movement—as an example, the longer the user has hovered the mouse over a text (meaning the user was reading the text)—the more indicative it is of the higher relevancy of the web resource.

The personalized ranking module 120 can track if the user has copied any portions of the web resource into clipboard of the electronic device 102—as an example, the fact of copying may be indicative it is of the higher relevancy of the web resource.

The personalized ranking module 120 can track if the user has downloaded the web resource—as an example, the fact of downloading may be indicative it is of the higher relevancy of the web resource.

The personalized ranking module 120 can track user interaction with a specific element of the web resource—such as clicking on an e-mail address or the like—as an example, the fact of interaction with the specific element may be indicative it is of the higher relevancy of the web resource. Alternatively, the specific element of the web site can be forms to be filled or other fields to be filled.

Naturally, rather than looking at a single parameter, the personalized ranking module 120 may look at a combination of parameters, assigning a respective value (or a weighted) value to each of the parameters and then generating the composite parameter.

The method 300 then proceeds to step 308.

Step 308—Generating the User-Specific Ranking Model on the Basis of the Value Parameter and the Resource-Specific Feature Next, at step 308, the electronic device 102 generates a user-specific ranking model on the basis of the value parameter for the resource-specific feature.

Within some implementations of the present technology, the step of generating comprises applying a machine learning algorithm to create the user-specific ranking model using the resource-specific feature and the value parameter as a training set.

In some embodiments of the present technology, the method 300 further comprises storing an indication of the user-specific ranking model in a local memory.

In some embodiments of the present technology, the method 300 further comprises transmitting to the search engine server 116 the user-specific ranking model, the user-specific ranking model to be combined with a generic ranking model available on the search engine server 116 to create a combined ranking model, the combined ranking model for ranking search results generated on search queries originated from the user.

In other embodiments of the present technology, the method 300 further comprises transmitting to the search engine server the user-specific ranking model, the user-specific ranking model to be used with a generic ranking model available on the search engine to rank search results generated on search queries originated from the user. Within these embodiments of the present technology, the user-specific ranking model and the generic ranking model are for: (i) ranking search results using the generic ranking model to generate a generically ranked search results list; and (ii) re-ranking generically ranked search results list using the user-specific ranking model to generate a user-centric ranked search results list.

In some embodiments of the present technology, the steps 302-308 of the method 300 are performed at a first instance in time. At a second instance of time, which is after the first instance of time, the method 300 further comprises receiving, from the user, a search request; sending the search request to the search engine server; transmitting to the search engine server the user-specific ranking model, receiving from the search engine a ranked search result list, the ranked search result list having been ranked by the search engine server by executing the steps of: ranking search results using the generic ranking model to generate a generically ranked search results list; and re-ranking generically ranked search results list using the user-specific ranking model to generate a user-centric ranked search results list.

In alternative embodiments of the present technology, the method 300 further comprises, at the second instance in time, receiving, from the user, a search request; sending the search request to the search engine server; transmitting to the search engine server the user-specific ranking model, the user-specific ranking model to be combined with a generic ranking model available on the search engine server to create a combined ranking model; receiving from the search engine a ranked search result list, the ranked search result list having been ranked by the search engine server by applying the combined ranking model.

In will be recalled that in some embodiments of the method 300, the at least some of the resource-specific features are selected on the basis of a generic ranking model used by the search engine server to rank search results. It should be noted that the generic ranking model in itself can be personalized based on a server-tracked user interaction associated with the web resource.

Within these embodiments, the server-tracked user interaction associated with the resource-specific feature is of a different type than the user interaction associated with the resource-specific feature tracked by the electronic device 102. In other words, within embodiments of the present technology, it is possible that the generic ranking model is "personalized" based on user interactions and the resource-specific features tracked by the search engine server 116, while the user-specific ranking model is "personalized" based on the resource-specific features and the user interactions tracked at the electronic device 102.

Figure 4:
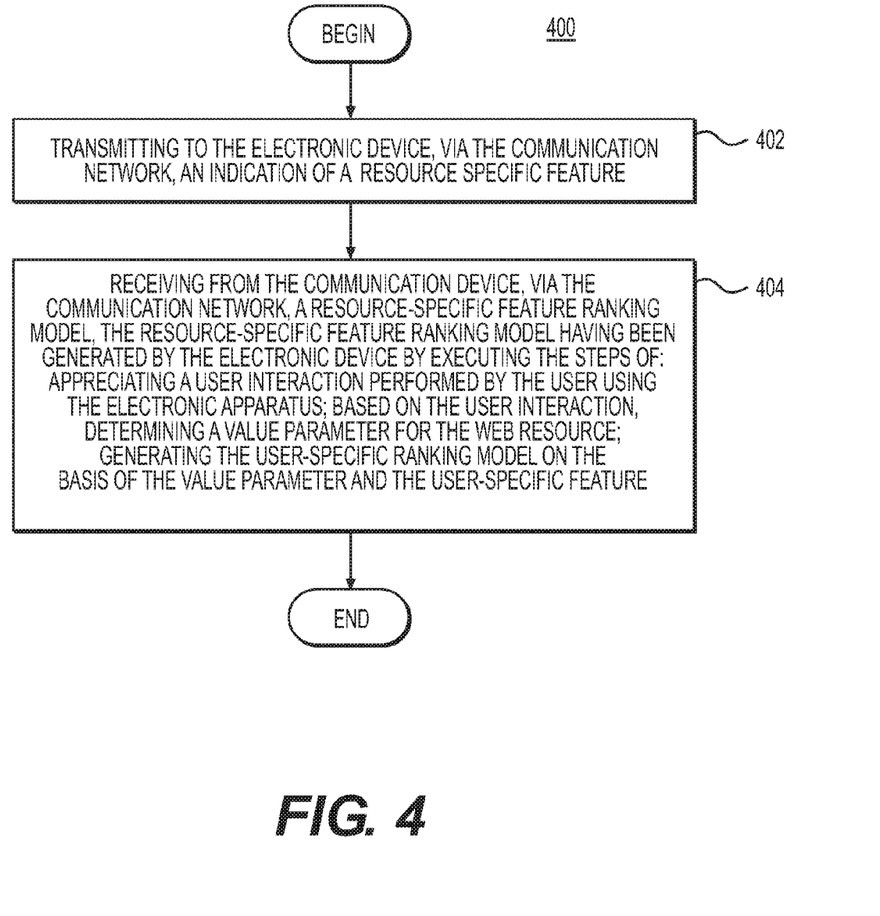
FIG. 4 is a flow chart of a method 400, the method 400 being executed in accordance with non-limiting embodiments of the present technology.

Given the architecture of the system 100 of FIG. 1, given the processes described with reference to FIG. 2, it is possible to implement a method of generating a user-specific ranking model. With reference to FIG. 4, there is depicted a flow chart of a method 400, the method 400 being executed in accordance with non-limiting embodiments of the present technology. The method 400 can be executed on the search engine server 116. In some embodiments of the present technology, the method 400 is executed by the ranking routine 121.

Step 402—Transmitting to the Electronic Device, Via the Communication Network, an Indication of a Resource-Specific Feature The method 400 starts at step 402, where the search engine server 116 transmits to the electronic device 102, via the communication network 114, an indication of a resource-specific feature.

In some embodiments, prior to executing the step 402, the search engine server 116 first selects the resource-specific feature for transmission to the electronic device 102. In some implementations, the resource-specific feature is the same resource-specific feature that is used in a generic ranking model used by the search engine server 116 for ranking search results. In other embodiments, the resource-specific feature comprises a plurality of resource-specific features each of the plurality of resource-specific features being the same resource-specific feature used in a generic ranking model used by the search engine server 116 for ranking search results.

In some embodiments, the step of selecting comprises choosing the resource-specific feature so that to optimize tracking of the user interaction on the electronic device 102. For example, the resource-specific feature can be selected such that the tracking of user interaction in respect to the resource-specific feature is better tracked locally on the electronic device 102, compared to the search engine server 116. As another example, the resource-specific feature can be selected such that the tracking of user interaction in respect to the resource-specific feature is only possible locally on the electronic device 102, and is not possible to be tracked at the search engine server 116.

The method 300 then proceeds to step 404.

Step 404—Receiving from the Communication Device, Via the Communication Network, a Resource-Specific Feature Ranking Model, the Resource-Specific Feature Ranking Model Having been Generated by the Electronic Device by Executing the Steps of: Appreciating a User Interaction Performed by the User Using the Electronic Apparatus; Based on the User Interaction, Determining a Value Parameter for the Resource-Specific Feature; Generating the User-Specific Ranking Model on the Basis of the Value Parameter for the Resource-Specific Feature Next, at step 404, the search engine server 116 receives from the communication device 102, via the communication network 114, a resource-specific feature ranking model, the resource-specific feature ranking model having been generated by the electronic device 102 by executing the steps of: (i) appreciating a user interaction performed by the user using the electronic apparatus 102; (ii) based on the user interaction, determining a value parameter for the resource-specific feature; (iii) generating the user-specific ranking model on the basis of the value parameter for the resource-specific feature.

In some embodiments the step 404 is executed responsive to receipt, by the electronic device 102, of the search request from the user.

In some embodiments if the present technology, the user interaction is indicative of a user preference associated with the web resource.

In some embodiments of the present technology, the steps 402-404 of the method 400 are performed at a first instance in time. At a second instance of time, which is after the first instance of time, the method 400 further comprises: receiving, from the electronic device, a search request; generating a set of search results responsive to the search query; ranking the set of search results using a generic ranking model to generate a generically ranked search results list; and re-ranking generically ranked search results list using the user-specific ranking model to generate a user-centric ranked search results list; sending the user-centric ranked search result list the electronic device. In some embodiments, the step of receiving the search request and receiving the user-specific ranking model are executed at the same time.

In some alternative implementations of the method 400, either at the first instance in time or at the second instance in time or any instance in time therebetween), the method 400 further comprises combining user-specific ranking model with a generic ranking model available on the search engine server to create a combined ranking model. Then, at the second instance of time, the method 400 further comprises: receiving, from the electronic device, a search request; generating a set of search results responsive to the search query; using said combined ranking model, ranking the set of search results to generate a user-centric ranked search results list; sending the user-centric ranked search result list the electronic device.

In some embodiments, the steps of tracking the resource-specific feature and generating the user-specific ranking model by the electronic device 102 can be done at an instance of time well before the actual search query being submitted by the user of the electronic device 102. Within these embodiments, the electronic device 102 can transmit the user-specific ranking model to the search engine server 116 together with the search query submitted by the user.

The search engine server 116 can then user the user-specific ranking model by either combining it with the generic ranking model or by executing a step of ranking by generic ranking model and then re-ranking with the user-specific ranking model to render the user centric search result list. The search engine server 116 can store the user-specific ranking model (or the combined ranking model having been generated on the basis of the user-specific ranking model) in an internal memory in association with an indication of the user associated with the electronic device 102.

It should be noted that in alternative embodiments of the present technology, the steps of tracking the resource-specific feature and generating the user-specific ranking model can be done at an instance of time well before the actual search query being submitted by the user of the electronic device 102. Within these embodiments, the search engine server 116 can store the user-specific ranking model (or the combined ranking model having been generated on the basis of the user-specific ranking model) in an internal memory in association with an indication of the user associated with the electronic device 102.

In some embodiments of the method 400, the step of combining comprises: adapting a value of the generic ranking model corresponding to the resource-specific feature to correspond to the one used in the user-specific ranking model.

Modifications and improvements to the above-described implementations of the present technology may become apparent to those skilled in the art. The foregoing description is intended to be exemplary rather than limiting. The scope of the present technology is therefore intended to be limited solely by the scope of the appended claims.

What is claimed is:

1. A method of generating a user-specific ranking model on an electronic device associated with a user, the method comprising:
  receiving, by the electronic device, from a search engine server, via a communication network, an indication of a plurality of resource-specific features associated with a web resource, at least a portion of the plurality of the resource-specific features being only trackable at the electronic device, the search engine server using a generic ranking model;
  receiving, by the electronic device, a user interaction with the web resource performed by the user using the electronic device;
  based on the user interaction, determining, by the electronic device, a value parameter for the web resource;
  generating, by a machine learning algorithm (MLA) on the electronic device, the user-specific ranking model on the basis of the value parameter and the plurality of resource-specific features;
  transmitting to the search engine server the user-specific ranking model, the transmitting causing the search engine server to retrain the generic ranking model with the user-specific ranking model to obtain a combined ranking model;
  sending, to the search engine server, a query from the user of the electronic device, causing the search engine server to:
    retrieve search results associated with the query;
    rank the search results by using the combined ranking model to generate a user-specific ranked search results list; and
    transmit the user-specific ranked search results list to the electronic device.

2. The method of claim 1, wherein another portion of the plurality of resource-specific features are used by the generic ranking model used by the search engine server for ranking search results.

3. The method of claim 1, wherein said user interaction is indicative of a user preference associated with the web resource.

4. The method of claim 1, wherein said generating comprises applying the machine learning algorithm to create the user-specific ranking model using the plurality of resource-specific features and the value parameter as a training set.

5. The method of claim 1, wherein the at least portion of the plurality of resource-specific features are selected so that to optimize tracking of the user interaction on the electronic device.

6. The method of claim 1, wherein another portion of the plurality of resource-specific features are selected on the basis of the generic ranking model used by the search engine server to rank search results.

7. The method of claim 6, wherein said generic ranking model is in itself personalized based on a server-tracked user interaction associated with the another portion of the plurality of resource-specific features.

8. The method of claim 7, wherein said server-tracked user interaction associated with the another portion of the plurality of resource-specific features is of a different type than said user interaction tracked by the electronic device.

9. A method of processing a query by using a user-specific ranking model, the method executable at a search engine server, the search engine server being coupled to an electronic device via a communications network, the search engine server using a generic ranking model, the electronic device being associated with a user, the method comprising:
  transmitting to the electronic device, via the communication network, an indication of a plurality of resource-specific features associated with a web resource, at least a portion of the plurality of the resource-specific features being only trackable at the electronic device;
  receiving, from the electronic device, via the communication network, the user-specific ranking model, the user-specific ranking model having been generated by the electronic device by executing the steps of:
    receiving, by the electronic device, a user interaction with the web resource performed by the user using the electronic device;
    based on the user interaction, determining, by the electronic device, a value parameter for the web resource;
    generating, by a machine learning algorithm (MLA) on the electronic device, the user-specific ranking model on the basis of the value parameter and the plurality of resource-specific features;
  combining, by the search engine server, the user-specific ranking model with the generic ranking model to create a combined ranking model by retraining the generic ranking model using the user-specific ranking model;
  receiving, by the search engine server, the query from the user of the electronic device;
  retrieving, by the search engine server, search results associated with the query; and
  ranking, by the search engine server, the search results by using the combined ranking model to generate a user-specific ranked search results list.

10. The method of claim 9, wherein another portion of the plurality of resource-specific features are used in a generic ranking model used by the search engine server for ranking search results.

11. The method of claim 9, wherein said selecting comprises choosing the at least the portion of the plurality of resource-specific features so that to optimize tracking of the user interaction on the electronic device.

12. The method of claim 9, wherein said user interaction is indicative of a user preference associated with the web resource.

13. The method of claim 12, further comprising:
  sending, by the search engine server, the user-specific ranked search result list to the electronic device.

14. The method of claim 13, wherein said combining comprises:
  adapting values of the generic ranking model corresponding to another portion of the plurality of resource-specific feature to correspond to the values used in the user-specific ranking model.

15. The method of claim 9, wherein:
  the user interaction is a plurality of user interactions; and
  the determining further comprises determining a plurality of value parameters based on the plurality of user interactions.

16. A server coupled to a communication network, the server comprising:
  a communication interface for communication with an electronic device via the communication network,
  a processor operationally connected with the communication interface,
  the processor being configured to:
    transmit to the electronic device, via the communication interface, an indication of a plurality of resource-specific features associated with a web resource, at least a portion of the plurality of the resource-specific features being only trackable at the electronic device, the search engine server using a generic ranking model;
    receive from the communication device, via the communication interface, a user-specific ranking model, the user-specific ranking model having been generated by the electronic device by executing the steps of:
      receiving, by the electronic device, a user interaction with the web resource performed by the user using the electronic device;
      based on the user interaction, determining, by the electronic device, a value parameter for the web resource;
      generating, by the electronic device, the user-specific ranking model on the basis of the value parameter and the plurality of resource-specific features;
    combine the user-specific ranking model with the generic ranking model to create a combined ranking model by retraining the generic ranking model using the user-specific ranking model;
    receive a query from the user of the electronic device;
    retrieve search results associated with the query; and
    rank the search results by using the combined ranking model to generate a user-specific ranked search results list.

17. The method of claim 1, wherein:
  the user interaction is a plurality of user interactions; and
  the determining further comprises determining a plurality of value parameters based on the plurality of user interactions.

18. The server of claim 16, wherein:
the user interaction is a plurality of user interactions; and
the determining further comprises determining a plurality of value parameters based on the plurality of user interactions.

* * * * *